(12) United States Patent
Doll et al.

(10) Patent No.: US 11,144,677 B2
(45) Date of Patent: Oct. 12, 2021

(54) METHOD AND APPARATUS FOR DIGITAL ONLY SECURE TEST MODE ENTRY

(71) Applicant: NXP USA, Inc., Austin, TX (US)

(72) Inventors: Stefan Doll, Munich (DE); Thomas Henry Luedeke, Oberbergkirchen (DE); Nikila Krishnamoorthy, Chennai (IN); Hubert Glenn Carson, Jr., Austin, TX (US); Anurag Jindal, Austin, TX (US); Hilario Manuel Garza, Cedar Park, TX (US); Kamel Musa Khalaf, Austin, TX (US); Joel Ray Knight, Austin, TX (US); Adrian Lee Carleton, Austin, TX (US)

(73) Assignee: NXP USA, Inc., Austin, TX (US)

( * ) Notice: Subject to any disclaimer, the term of this patent is extended or adjusted under 35 U.S.C. 154(b) by 259 days.

(21) Appl. No.: 16/535,854

(22) Filed: Aug. 8, 2019

(65) Prior Publication Data

US 2021/0042447 A1    Feb. 11, 2021

(51) Int. Cl.
*G06F 21/74* (2013.01)
*G06F 21/33* (2013.01)
*G06F 21/45* (2013.01)

(52) U.S. Cl.
CPC ............ *G06F 21/74* (2013.01); *G06F 21/335* (2013.01); *G06F 21/45* (2013.01); *G06F 2221/2103* (2013.01)

(58) Field of Classification Search
CPC ........ G06F 21/74; G06F 21/335; G06F 21/45; G06F 2221/033
See application file for complete search history.

(56) References Cited

U.S. PATENT DOCUMENTS

| | | | | |
|---|---|---|---|---|
| 7,185,249 B2* | 2/2007 | Tkacik | ............. | G01R 31/31719 714/726 |
| 7,987,331 B2* | 7/2011 | Borri | ............. | G01R 31/318544 711/166 |
| 9,927,490 B2* | 3/2018 | Hao | ................ | G01R 31/318536 |
| 10,955,473 B1* | 3/2021 | Jain | .................... | G01R 31/3177 |
| 2006/0020864 A1* | 1/2006 | Turner | ........... | G01R 31/318588 714/726 |
| 2010/0333055 A1 | 12/2010 | Yu et al. | | |
| 2013/0254609 A1* | 9/2013 | Yonetoku | ....... | G01R 31/318552 714/729 |

(Continued)

OTHER PUBLICATIONS

Yuta Atobe et al., Dynamically Changeable Secure Scan Architecture against Scan-Based Side Channel Attack, ISOCC 2012.

(Continued)

*Primary Examiner* — Tongoc Tran

(57) ABSTRACT

A fully digital integrated circuit apparatus (200) and method (300) are provided for generating a test mode enable signal with a digital non-resettable state retention storage circuit (210) connected to store an authentication control pattern for authorizing test mode access to a secure circuit, a digital safety interlock gate circuit (220) connected to store a safety interlock gate setting that may be accessed independently from a test mode enable signal, and combinatorial logic circuitry (205) for generating the test mode enable signal only when the interlock safety gate setting is set to a first value and the digital non-resettable state retention storage circuit stores the authentication control code.

21 Claims, 3 Drawing Sheets

(56) References Cited

U.S. PATENT DOCUMENTS

| | | |
|---|---|---|
| 2016/0091561 A1 | 3/2016 | Knight et al. |
| 2017/0141930 A1 | 5/2017 | Rajski et al. |
| 2018/0203065 A1* | 7/2018 | Dani ................ G01R 31/31725 |
| 2019/0007200 A1 | 1/2019 | Shah et al. |

OTHER PUBLICATIONS

Wen Chen et al., NXP Semiconductor Inc., Striking a Balance Between SoC Security and Debug Requirements, IEEE International System-on-Chip Conference, Sep. 2016.

* cited by examiner

METHOD AND APPARATUS FOR DIGITAL ONLY SECURE TEST MODE ENTRY

BACKGROUND OF THE INVENTION

Field of the Invention

The present invention is directed in general to the field of security protection in data processing systems. In one aspect, the present invention relates generally to a method and apparatus for securely enabling test mode operations.

Description of the Related Art

As circuit complexity increases with advances in the design and manufacture technology, testability of integrated circuits has increasing importance. However, modern integrated circuits often limit or prevent any access to certain portions, such as secure storage, cryptography circuits, etc., which are designed to be inaccessible from external pins and/or various other functional units. To overcome the problem of having limited access to internal circuit areas via functional units, various design-for-test (DFT) techniques have been developed. One such technique is to provide internal scan chains in the device wherein a number of serially coupled scan elements are used to input test stimulus data into the integrated circuit, to conduct tests of circuitry within the integrated circuit based on the test stimulus data, to capture test result data from the scan elements, and to shift the captured data from the integrated circuit for further analysis. Because scan chain tests can provide high fault coverage, full controllability and observability, they are widely used in most modern integrated circuits. However, because scan chains and other similar techniques may enable access and manipulation of portions of an integrated circuit that are otherwise inaccessible, some attack methods on crypto hardware implementations have been proposed which can use scan chains to perform "scan-based" attacks.

Several secure scan architectures against known scan-based attacks have been proposed, including providing a private controller limitation to make the scan path unusable for attackers. For example, devices may include fuse elements which can be "blown" by the supplier after production testing to prevent or limit scan access by any user or themselves. But such mechanisms can be problematic when there are device failures in the field which the supplier may need to analyze, such as by running test patterns (e.g., ATPG patterns or functional test patterns) on a returned device. However, since the fuse element has made the scan path unusable, the supplier will not be able to evaluate the unit in its 'user' state.

Another secure scan architecture approach is to include a test controller which limits the access to scan chains by comparing scan data with a preset value when the circuit is designed. However, this approach can lead to high timing overhead due to the value-comparing operation in the initial test phase, especially when test patterns are separated by device resets, thereby restarting the initial test phase with each test pattern. This approach also allows for a static scan value to be discovered that could still allow for "scan-based" attacks.

Yet another approach is for the device to include an analog detector for use in clearing an authorization status during a low power condition, but such analog detectors are not easily portable to other process nodes, such as the advanced process nodes like 16 nm fin FET which make the integration of analog systems more and more difficult. This approach also allows for a static 'external pin' value to be discovered that could provide a path for a "scan based" attack.

As seen from the foregoing, the existing solutions for preventing scan-based attacks are not effective for modern, highly secure integrated circuits. They are extremely difficult at a practical level by virtue of the difficulty to balance the design constraints for test access with the requirement to provide security protection to data processing systems. This is particularly important with reference to enabling efficient scan chain or other testing for customer issues in modern integrated circuit devices without permanently changing the device's "user" security state, which allows the device to be safely and securely exchanged between customer and supplier, and to be returned to the field application to reproduce an issue or failure under normal operating conditions.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A fully digital test control access system, apparatus, and methodology are described for securely and efficiently enabling test mode operations by storing an authentication control pattern in a non-resettable state retention storage once obtained through an initial authentication sequence, and then enabling a test mode only when a safety interlock is set while the state retention storage stores the authentication control pattern. In selected embodiments, the digital test control access hardware uses authentication logic to authorize a test mode and to obtain an authentication control pattern using any suitable authorization method, such as a password or challenge-response handshake. Upon storing the authentication control pattern in the state retention storage with a plurality of non-resettable flip-flops, the digital test control access hardware may persistently maintain the test mode authorization through device resets. In addition, the test mode authorization may embody the safety interlock with one or more resettable storage devices to store a safety gate setting that may be set independently from the test mode. Finally, the digital test control access hardware includes circuitry for logically combining (e.g., with an "AND" gate) a test mode authorization status indicator with the safety gate setting to enable a test mode only when both the safety setting and authentication control pattern are stored in the digital test control access hardware. With the disclosed digital test control access hardware, security and safety protections are provided which enable a device to be tested after deployed to the field without changing the device to an inoperable mode by loading an authentication control code into persistent, non-resettable memory and requiring a gate safety setting in combination with the authentication control code to enable test mode.

Figure 1:
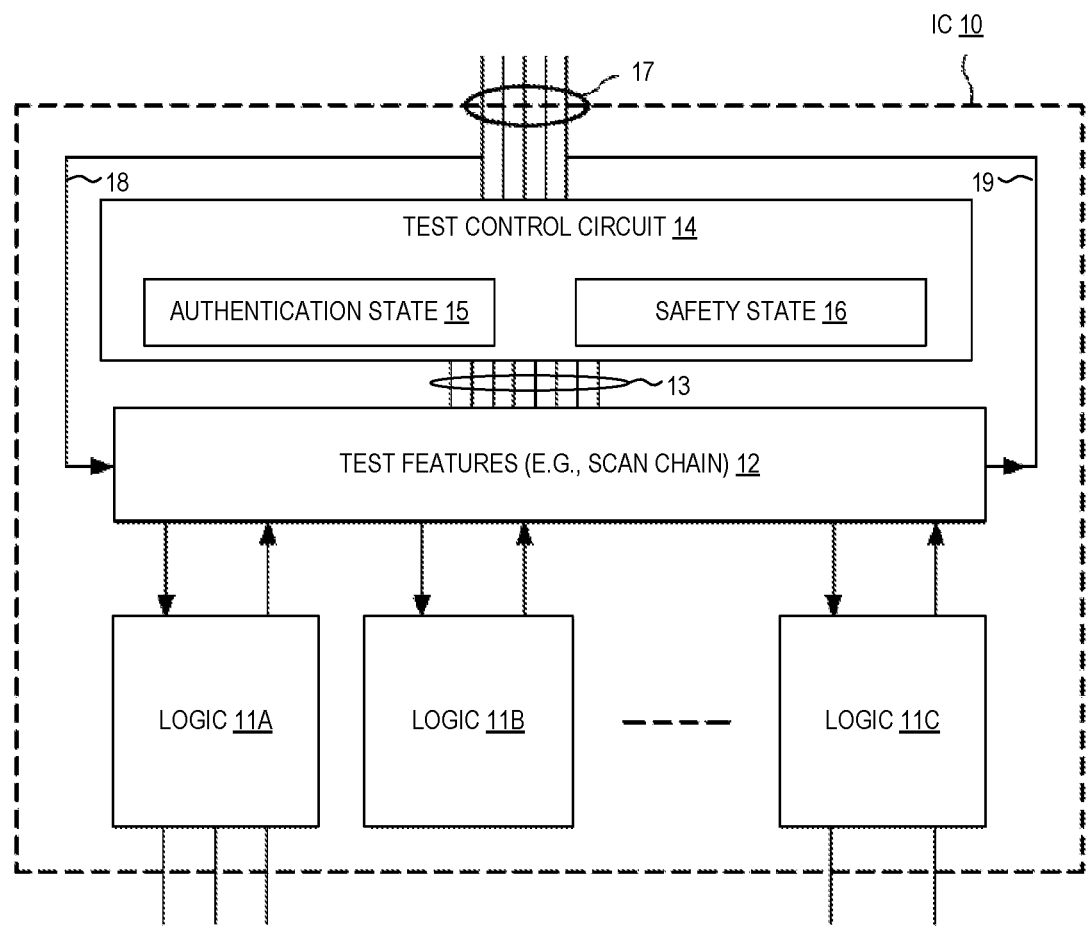
FIG. 1 is a simplified block diagram of an integrated circuit with a test access control circuit to protect access to circuits via a scan chain in accordance with selected embodiments of the present disclosure.

To provide a contextual understanding for selected embodiments of the present disclosure, reference is now made to FIG. 1 which is a simplified block diagram of an integrated circuit 10 with a test access control circuit 14 to protect access to circuit or logic elements 11a-c via a scan chain 12. As illustrated, the test access control circuit 14 has inputs coupled to an external test interface 17 and control outputs 13 coupled to scan chain 12. Scan chain 12 has an input 18 coupled to a test data input of external test interface 17 and an output 19 coupled to a test data output of external test interface 17. Scan chain 12 is also coupled to inputs and outputs of functional logic functional circuits 11a-c. Although single input and output lines are shown between functional circuits 11a-c and scan chain 12, it will be appreciated that in practice many such lines may be provided in parallel.

As will be appreciated, FIG. 1 has been limited to aspects of the integrated circuit 10 that serve to explain the use of the test control circuit 14 in the context of an example scan chain application where an arbitrary number of functional circuits 11a-c has been shown with arbitrary external connections. In practice, many additional test-features may be present, such as a boundary scan chain coupled between the integrated circuit-external inputs and outputs of functional circuits 11a-c, a plurality of parallel scan chains coupled between the same test data input and output, shared use of terminals of integrated circuit 10 for input/output of functional circuit and test interface 17, etc.

In selected embodiments, one or more of the functional circuits 11a-c may contain secret information that should not leave integrated circuit 10. Typically, this information is a cryptographic key or an identity code which may be stored in a non-volatile memory in the relevant functional circuit 11a-c or otherwise programmed in this functional circuit 11a-c or defined by circuits that have been implemented in the functional circuit 11a-c. Typically, each manufactured integrated circuit has its own unique secret information, but alternatively the secret information may be the same for every integrated circuit of a class.

In operation, the integrated circuit 10 can be switched between a normal functional mode and a test mode. In the normal functional mode, flip-flops from scan chain 11 serve as flip-flops that are coupled between inputs and outputs of functional circuits 11a-c. In the test mode, the inputs of flip-flops in the scan chain are coupled to the outputs of other flip-flops in the scan chain, thereby forming a serial shift register. In an example scan test mode, the test control circuit 14 first enters a shift input mode of operation wherein the flip-flops of the scan chain 12 are coupled in series and test stimuli from the test data input are serially shifted through scan chain 12 for application to the inputs of functional circuits 11a-c. Subsequently, the test control circuit 14 circuit enters a capture mode wherein the inputs of flip-flops of the scan chain 12 are coupled to the outputs of functional circuits 11a-c so that these flip-flops capture test responses from functional circuits 11a-c. After this, the test control circuit 14 returns to a shift mode wherein the flip-flops of scan chain 12 are connected to form a shift register that shifts captured data to the test data output out of integrated circuit 10.

Instead of relying on conventional controls, such as fuses or analog detectors, to secure access to test mode operations and retain that access through reset, the test control circuit 14 uses dedicated digital hardware to store the authentication state 15 and safety state 16 of the IC device 10 which are logically combined to enable test mode operations. In selected embodiments, the authentication state 15 is stored in a set of storage elements which are never reset, such as by loading a sequence of flip-flops with an authorization control pattern after successfully authenticating a request for test mode access. In addition, the safety state 16 is stored in a safety interlock storage element which can be reset and which can be set without requiring authentication. Since the state of the storage elements storing the authentication state 15 is unpredictable, the safety interlock storage element applies the safety state 16 to gate the authentication status 15 for purposes of enabling test mode operations of the scan chain 12, thereby combining the two parts to address the security (non-resettable authorization storage elements 5) and safety (resettable storage element 16) concerns.

Figure 2:
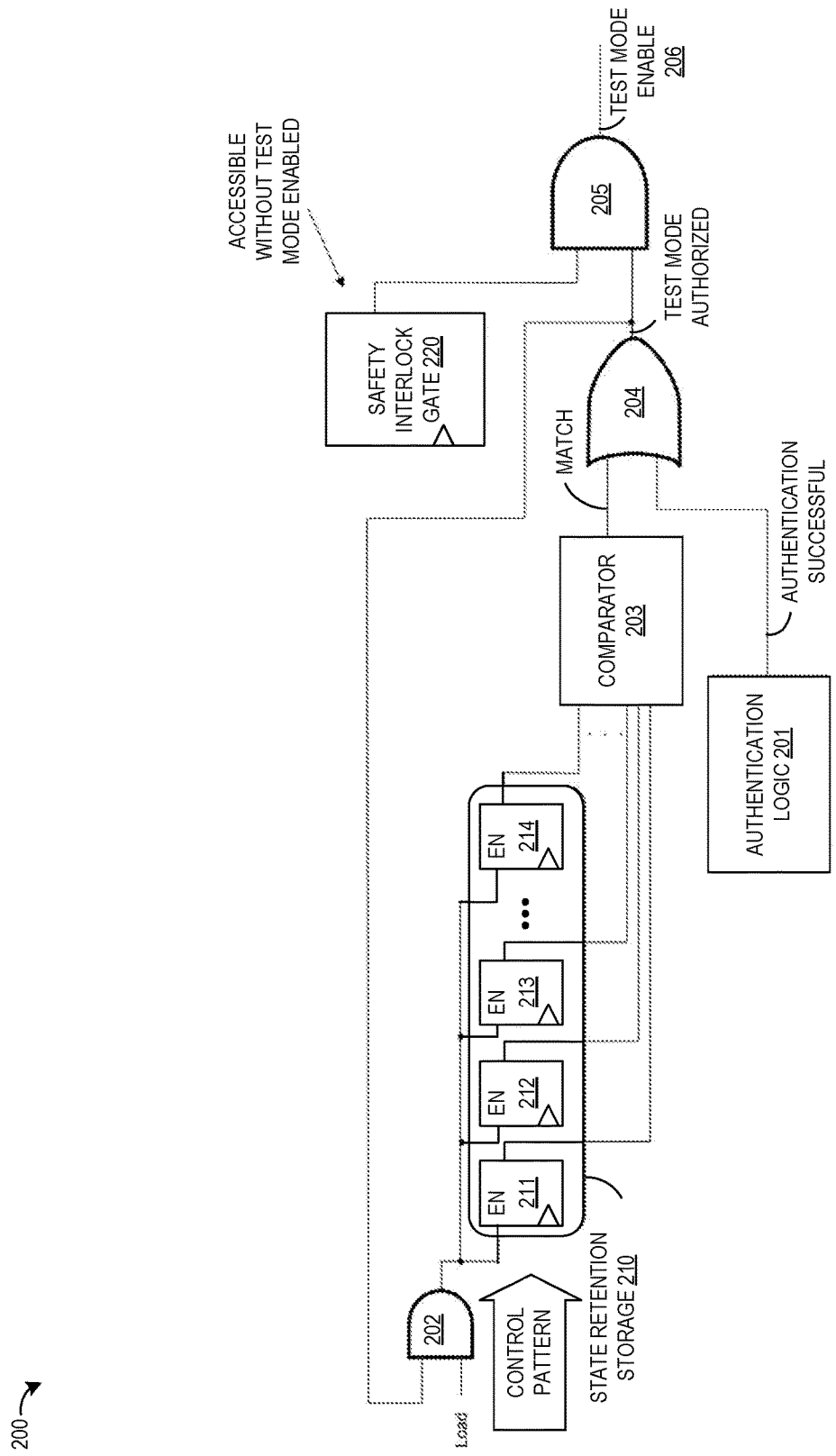
FIG. 2 depicts a circuit schematic diagram of a fully digital test access control circuit in accordance with selected embodiments of the present disclosure.

For an improved understanding of selected embodiments of the present disclosure, reference is now made to FIG. 2 which illustrates a circuit schematic diagram of a fully digital test access control circuit 200 that may be used to securely and efficiently enable test mode operations. As illustrated, the test access control circuit 200 includes authentication logic 201, state retention storage 210, a safety interlock gate 220, and interconnecting combinatorial logic 202-205 which generate a test mode enable signal 206 only when the safety interlock gate 220 is set while the state retention storage 210 stores the control pattern. As disclosed herein, the test access control circuit 200 may advantageously be used by the manufacturer or supplier of an integrated circuit device to perform tests on devices, that have failed in the field, by providing a digital circuit that prevents unauthorized field access to the test mode while also reducing the need for the manufacturer/supplier to perform frequent authorizations during test mode entry and also preventing the test mode from being accidentally activated as that would interfere with the normal operation of the device.

As will be appreciated, the authentication logic 201 may be accessed by the manufacturer/supplier to initiate testing of a device which may have failed in the field, such as running scan test patterns. To prevent field access to the scan chain elements in the device, the authentication logic 201 may use any suitable authorization method (e.g., password or a random challenge/response handshake) which enables the supplier to securely provide test access. In general, authorizations are cleared by device resets which frequently are placed at the start of test patterns. This requires these test patterns to include the authentication sequence which may be more complicated than the production test equipment can support in a normal test pattern. It also may require two versions of test patterns, one without the authentication sequence for the factory test flow and another with authentication for retest of devices that fail in the field. This adds development cost and risk in performing frequent authorizations to regain test authorization status after every reset. In addition, some manufacturing tests include embedded resets. Having to re-authorize in the middle of a test can break the intention of the test.

To the address the problem of reset-triggered authentications, the state retention storage 210 provides a mechanism for persistently saving the test mode authorization status through one or more device resets. While any suitable storage mechanism may be used, the state retention storage 210 may be embodied with a plurality of non-resettable flip-flops 211-214 which are connected to receive the control pattern which is written after successful authentication from authentication logic 201. When constructed with flip-flops 211-214 that are not reset and that are not cleared in test mode, the state retention storage 210 retains the test mode authorization status once it has originally been established by loading the flip-flops 211-214 with the control pattern. In selected embodiments, a large number of FFs is chosen to protect the state retention storage 210 against various attack types, such as voltage attacks, glitch attacks, temperature attacks or other fault attacks. In addition, the control pattern will contain both 1s and 0s to protect against simple attacks (such as a voltage attack) which can make all FFs take a certain value. While the flip-flops 211-214 never reset, a power down/power up sequence may end up with a random value being stored in the state retention storage 210, but with a larger number of flip-flops, there is a minimal or negligible likelihood of the random value matching the control pattern. Indeed, the chance of an accidental match (assuming equal likelihood for both 1s and 0s) would be approximately $1/(2^n)$, where n is the number of flip-flops 211-214 in the state retention storage 210.

To control access to the state retention storage 210, the authentication logic 201 may be connected to supply an "authentication successful" signal to OR gate 204 which then generates a test mode authorization signal for input to the combinatorial logic elements 202, 205. With the test mode authorization signal provided to AND gate 202, the authentication control pattern may then be loaded into the non-resettable flip-flops 211-214 over a series of clock cycles. Once loaded with the control code, the flip-flops 211-214 in the state retention storage 210 supply the stored control code values to the multi-bit comparator 203 which generates an output "match" signal when the stored control pattern matches the required value. With the "match" signal supplied to the OR gate 204, the test mode authorization signal is set when either the "authentication successful" signal is set by the authentication logic 201 (e.g., upon initiating test mode) or the "match" signal is set by the multi-bit comparator 203 (e.g., when the state retention storage 210 stores the correct control code).

With the authorization status persistently stored in the state retention storage 210, it is important to prevent the test mode from being accidentally enabled. To prevent unintentional test mode activation, the safety interlock gate 220 in the test access control circuit 200 may be programmed with a test mode safety signal for input to the combinatorial logic element 205. While any suitable storage mechanism may be used, the safety interlock gate 220 may be embodied with one or more resettable flip-flops which are accessible without requiring test mode. By default, the safety interlock gate flip-flop(s) will be reset to disable a test mode, and a device reset will return the safety interlock gate 220 to that state. By setting the safety interlock gate 220 only when test mode is to be enabled, the combinatorial logic element 205 may be embodied as an "AND" gate to generate the test mode enable signal 206 only when the test mode is authorized by the OR gate 204 (e.g., when the state retention storage 210 stores the correct control code) at the same time the safety interlock gate 220 is set, thereby preventing accidental enablement of test mode.

As will be appreciated, there are numerous advantages provided by the fully digital test access control circuit 200. For example, by taking advantage of the randomness of the power up state of non-resettable flip-flops, this eliminates the need for analog reset circuits to clear the state retention storage 210, thereby simplifying the design and fabrication process. In addition, there are safety benefits provided by implementing the safety interlock gate 220 with one or more resettable flip-flops to ensure that the test mode will not be activated accidentally. The disclosed digital test access control circuit 200 also allows devices, which have failed in the field, to be tested by the supplier and be returned to the customer multiple times if no failure is found in the device by the manufacturer. In particular, the digital nature of the solution means that no permanent modifications need to be made in the device (e.g., burning a fuse or writing non-volatile storage) which could limit the number of times the device could be returned to the customer or modify the device in a way which could alter its behavior (which might obscure a defect). And using the state retention storage 210, the test mode authorization state can be preserved without requiring re-authentication for test mode access. In addition, test patterns can be re-used from manufacturing tests without requiring modifications that could otherwise be necessary if authentication was required in each pattern, thereby reducing the required test development time.

Figure 3:
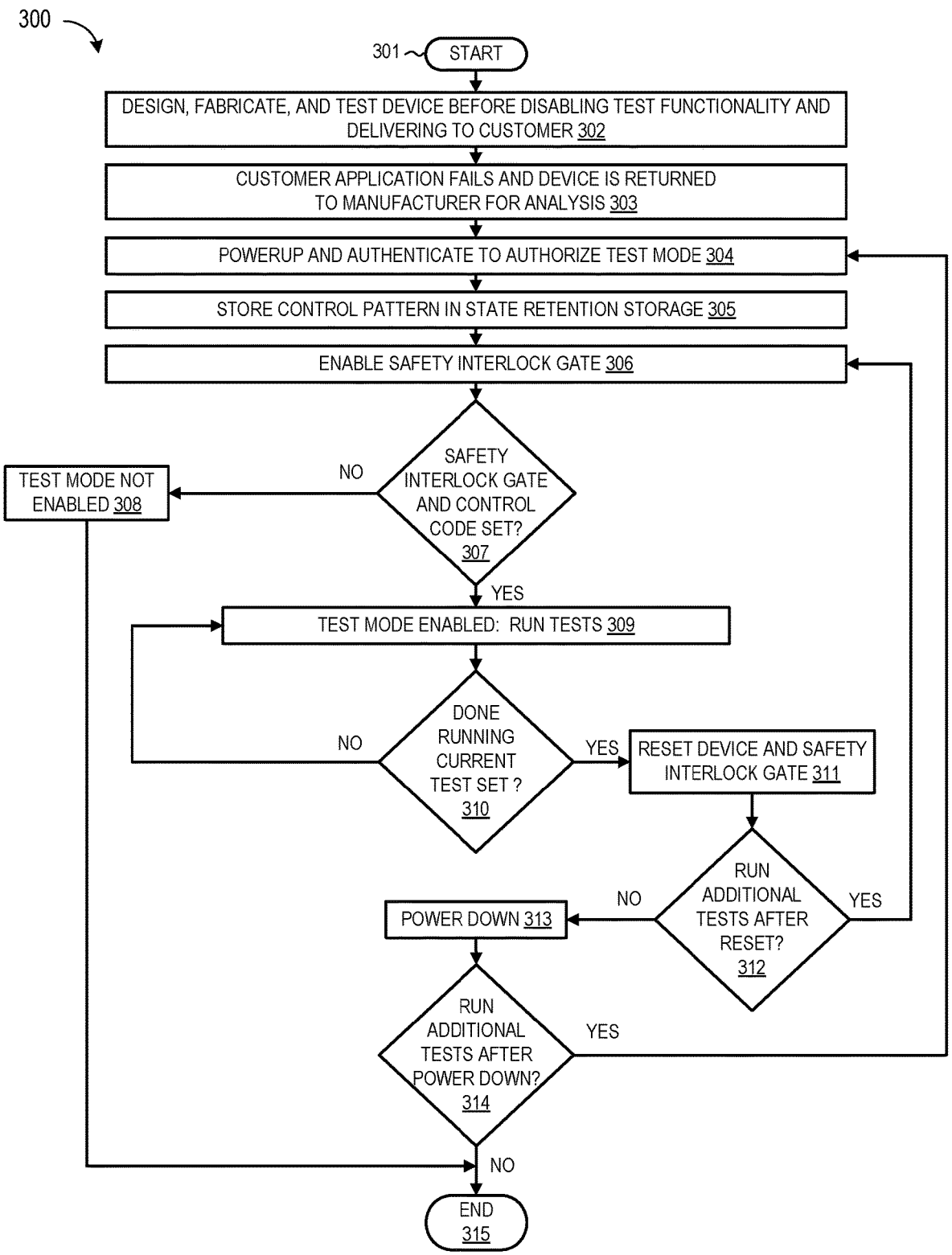
FIG. 3 illustrates a simplified flow chart showing the logic for securely and efficiently enabling test mode operations in accordance with selected embodiments of the present disclosure.

To provide additional details for an improved understanding of selected embodiments of the present disclosure, reference is now made to FIG. 3 which depicts a simplified flow chart 300 showing the control logic for securely and efficiently enabling test mode operations in a data processing system. After beginning at step 301, an initial step in the overall process occurs when an integrated circuit device is designed and fabricated by the manufacturer (step 302). At this time, the IC device may be tested by the manufacturer who is able to access factory test features in the IC device, such as scan chain circuits, to test the performance and functionality of the device. Upon passing any required tests, the test functionality is disabled before delivering the IC device to the customer or supplier. Disabling test mode is generally done by burning fuses or writing non-volatile storage. In normal operation, the customer does not need access to factory test modes.

At step 303, the customer experiences a failure in the application and returns the suspect IC device to the manufacturer for failure analysis. This is a contractual requirement for many automotive customers and other industries with high quality requirements.

To analyze if and how a returned IC device has failed, the manufacturer/supplier will need access to factory test modes. Test mode authorization is accomplished through security authentication using standard industry methods. As will be appreciated, the authorization process may be implemented with a digital test control access hardware which includes authentication logic to require input of a password, a challenge-response-based authentication sequence, or other appropriate security mechanism to authorize factory test modes.

At step 305, the control pattern is stored in a state retention storage. In accordance with selected embodiments of the present disclosure, the state retention storage may be implemented in the digital test control access hardware as a non-resettable storage formed with a plurality of n non-resettable flip-flops which are loaded with the control pattern. By using non-resettable flip-flops to store the control pattern, the state retention storage persistently maintains the test mode authorization through device resets.

At step 306, a safety interlock gate is set to enable factory test modes. In accordance with selected embodiments of the present disclosure, the safety interlock gate may be implemented in the digital test control access hardware with one or more resettable storage devices which may be programmed to store a safety interlock gate setting that may be set independently from the test mode. By using resettable flip-flops to store the safety interlock gate setting, accidental activation of the test mode is prevented.

At step 307, the process detects if the safety interlock gate and control pattern are both present and set. In accordance with selected embodiments of the present disclosure, the detection step may be implemented in the digital test control access hardware with one or more combinatorial logic elements. For example, the combinatorial logic elements may include a first comparison circuit needed to authorize access that may be connected to generate a match signal when the values stored in the state retention storage match a predetermined control pattern. The combinatorial logic elements may also include an AND gate that has inputs connected to receive a reading from the safety interlock gate as a first input and to receive the match signal or other test mode authorization signal as the second input. If the safety interlock gate setting and control pattern are not both set or present (negative outcome to detection step 307), then there is no test mode enablement (step 308). However, if the safety interlock gate setting and control pattern are both set or present (affirmative outcome to detection step 307), then the test mode is enabled.

Once factory test mode is enabled, device tests can be performed (step 309). If additional tests can be run without resetting the safety interlock gate, the test can be run without needing to set it again in step 306. Otherwise the flow proceeds to step 311.

A device reset will clear the safety interlock gate (step 311). Factory test mode is now disabled but still authorized by the control pattern in the state retention storage.

If there are more tests to be run after a device reset (affirmative outcome to detection step 312), then the safety interlock gate needs to be re-enabled in step 306. If not (negative outcome to detection step 312), the device is powered down (step 313).

If there are more tests to be run after a power down (affirmative outcome of detection step 314), the flow returns to step 304 where the device is powered up and authentication is done again. As seen from the foregoing, an advantage of the disclosed methodology is it allows all test mode authentication to be placed in a common part of the test flow (i.e., power up routine) and allows reuse of the same test patterns used in the factory test. If all testing is complete (negative outcome to detection step 314), the flow ends in step 315. If one or more tests fail in the test flow, additional analysis can be done to determine the exact cause of the failure. If no tests fail, the device can be returned to the customer to check if it still fails in the application. Since no permanent change was needed to test the device, it can be returned to the customer without risking security assets or potentially changing the functionality of the device.

Some of the above embodiments, as applicable, may be implemented using a variety of different data processing systems. For example, although FIG. 1 and the discussion thereof describe an exemplary data processing architecture of microcontroller SoC device in which a test access control circuit is employed, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architecture depicted herein is merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

By now it should be appreciated that there has been provided an integrated circuit apparatus, method, program code, and system for generating the test mode enable signal. In the disclosed integrated circuit apparatus, method, program code, and system, a digital non-resettable state retention storage circuit connected to store an authentication control pattern for authorizing test mode access to a secure circuit. In selected embodiments, the digital non-resettable state retention storage circuit is embodied with a plurality of non-resettable storage elements, such as non-resettable flip-flop storage devices, connected in series to store the authentication control pattern for authorizing test mode access to the secure circuit. In such embodiments, the non-resettable flip-flop storage devices may be connected to load the authentication control pattern in response to successful authentication by authentication logic. In other embodiments, the digital non-resettable state retention storage circuit is configured to store the authentication control pattern through device reset events but not through device power down events. The integrated circuit also includes a digital safety interlock gate circuit connected to store a safety interlock gate setting that may be accessed independently from a test mode enable signal. In selected embodiments, the digital safety interlock gate circuit may be embodied with one or more digital resettable storage elements for storing the safety interlock gate setting. In addition, the integrated circuit includes combinatorial logic circuitry for generating the test mode enable signal only when the safety interlock gate setting is set to a first value and the digital non-resettable state retention storage circuit stores the authentication control pattern. In selected embodiments, the combinatorial logic circuitry may be embodied with a logical AND gate connected to receive the safety interlock gate setting and a match signal derived from the digital non-resettable state retention storage circuit to generate the test mode enable signal only.

In another form, there is provided a test control method, integrated circuit apparatus, program code, and system. In the disclosed method, a test control device performs an admissions control process to authorize test mode access to a secure circuit in an integrated circuit device. In selected embodiments, the admissions control process is performed during power up mode of the integrated circuit device. In other embodiments, the admissions control process is performed as a challenge-response process or by receiving a certificate or password. In addition, an authentication control pattern is generated in response to authorizing test mode access to the secure circuit in the integrated circuit device. At the test control device, the authentication control pattern is stored in a digital non-resettable state retention storage circuit. In selected embodiments, the authentication control pattern may be stored in a plurality of non-resettable storage elements connected in series to store the authentication control pattern for authorizing test mode access to the secure circuit. In such embodiments, the authentication control pattern may be loaded in the plurality of non-resettable storage devices in response to successful authentication by authentical logic. In addition, the test control device generates a test mode enable signal with combinatorial logic circuitry which detects when the digital non-resettable state retention storage circuit stores the authentication control pattern. The disclosed method may also include receiving, at the test control device, a test mode safety signal, and then storing the test mode safety signal at a safety interlock gate that may be accessed independently from the test mode enable signal. In such embodiments, the safety interlock gate may be embodied with one or more digital resettable storage elements for storing the test mode safety signal. In addition, the generation of the test mode enable signal may use the combinatorial logic circuitry to generate the test mode enable signal only when both the digital non-resettable state retention storage circuit stores the authentication control pattern and the safety interlock gate stores the test mode safety signal that is set to a first value. The disclosed method may also include resetting the digital non-resettable state retention storage circuit to remove the authentication control pattern at a power down event but not at a device reset event.

In yet another form, there is provided a fully digital test control access system for an integrated circuit which includes a secure unit, test circuitry, and test control access circuitry. The disclosed secure unit includes one or more logic elements that are protected from test access during normal operation. In selected embodiments, the secure unit includes a plurality of logic elements connected in a scan chain to receive test access from the test circuitry during test operation. The disclosed test circuitry is connected to the one or more logic elements and is configured to provide test access to the one or more logic elements in response to a test mode enable signal. In selected embodiments, the test circuitry includes a plurality of scan flip-flops connected in a chain to provide test access to the one or more logic elements. The test control access circuitry is connected to authorize and enable test access by the test circuitry to the secure unit. To this end, the test control access circuitry includes a digital non-resettable state retention storage circuit for storing an authentication control pattern which is generated in response to authorized test mode access to the secure unit. In selected embodiment, the digital non-resettable state retention storage circuit is embodied with a plurality of non-resettable storage flip-flop devices connected (e.g., in series or in parallel) to sequentially load the authentication control pattern in response to successful authentication by authentical logic. In addition, the test control access circuitry includes combinatorial logic circuitry for generating the test mode enable signal when the digital non-resettable state retention storage circuit stores the authentication control pattern. In selected embodiments, the fully digital test control access system also includes a digital safety interlock gate circuit connected to store a safety interlock gate setting that may be accessed independently from the test mode enable signal.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Although the described exemplary embodiments disclosed herein are directed to an exemplary digital only secure test mode entry solution, the present invention is not necessarily limited to the example embodiments illustrate herein, and various embodiments of the circuitry and methods disclosed herein may be implemented with other devices and software components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An integrated circuit, comprising:
   a digital non-resettable state retention storage circuit connected to store an authentication control pattern for authorizing test mode access to a secure circuit;
   a digital safety interlock gate circuit connected to store a safety interlock gate setting that may be accessed independently from a test mode enable signal; and
   combinatorial logic circuitry for generating the test mode enable signal only when the safety interlock gate setting is set to a first value and the digital non-resettable state retention storage circuit stores the authentication control pattern.

2. The integrated circuit of claim 1, where the digital non-resettable state retention storage circuit comprises a plurality of non-resettable storage elements connected to store the authentication control pattern for authorizing test mode access to the secure circuit.

3. The integrated circuit of claim 2, where the plurality of non-resettable storage elements comprises a plurality of non-resettable flip-flop storage devices.

4. The integrated circuit of claim 3, where the plurality of non-resettable flip-flop storage devices are connected to load the authentication control pattern in response to successful authentication by authentical logic.

5. The integrated circuit of claim 1, where the digital safety interlock gate circuit comprises one or more digital resettable storage elements for storing the safety interlock gate setting.

6. The integrated circuit of claim 1, where the combinatorial logic circuitry comprises a logical AND gate connected to receive the safety interlock gate setting and a match signal derived from the digital non-resettable state retention storage circuit to generate the test mode enable signal only.

7. The integrated circuit of claim 1, where the digital non-resettable state retention storage circuit is configured to store the authentication control pattern through device reset events but not through device power down events.

8. A test control method comprising:
performing, by a test control device, an admissions control process to authorize test mode access to a secure circuit in an integrated circuit device;
generating an authentication control pattern in response to authorizing test mode access to the secure circuit in the integrated circuit device;
storing the authentication control pattern in a digital non-resettable state retention storage circuit at the test control device; and
generating, by the test control device, a test mode enable signal with combinatorial logic circuitry which detects when the digital non-resettable state retention storage circuit stores the authentication control pattern.

9. The test control method of claim 8, where performing the admissions control process occurs during power up mode of the integrated circuit device.

10. The test control method of claim 8, where performing the admissions control process comprises performing a challenge-response process or receiving a certificate or password.

11. The test control method of claim 8, further comprising:
receiving, at the test control device, a test mode safety signal; and
storing the test mode safety signal at a safety interlock gate that may be accessed independently from the test mode enable signal.

12. The test control method of claim 11, where the safety interlock gate comprises one or more digital resettable storage elements for storing the test mode safety signal.

13. The test control method of claim 11, where generating the test mode enable signal comprises using the combinatorial logic circuitry to generate the test mode enable signal only when both the digital non-resettable state retention storage circuit stores the authentication control pattern and the safety interlock gate stores the test mode safety signal that is set to a first value.

14. The test control method of claim 8, where storing the authentication control pattern comprises storing the authentication control pattern in a plurality of non-resettable storage elements connected to store the authentication control pattern for authorizing test mode access to the secure circuit.

15. The test control method of claim 14, where storing the authentication control pattern comprises sequentially loading the plurality of non-resettable storage devices with the authentication control pattern in response to successful authentication by authentical logic.

16. The test control method of claim 8, further comprising resetting the digital non-resettable state retention storage circuit to remove the authentication control pattern at a power down event but not at a device reset event.

17. A fully digital test control access system for an integrated circuit, comprising:
a secure unit comprising one or more logic elements that are protected from test access during normal operation;
test circuitry connected to the one or more logic elements, wherein the test circuitry is configured to provide test access to the one or more logic elements in response to a test mode enable signal; and
test control access circuitry connected to authorize and enable test access by the test circuitry to the secure unit, the test control access circuitry comprising:
a digital non-resettable state retention storage circuit for storing an authentication control pattern which is generated in response to authorized test mode access to the secure unit; and
combinatorial logic circuitry for generating the test mode enable signal when the digital non-resettable state retention storage circuit stores the authentication control pattern.

18. The fully digital test control access system of claim 17, where the secure unit comprises a plurality of logic elements connected in a scan chain to receive test access from the test circuitry during test operation.

19. The fully digital test control access system of claim 18, where the test circuitry comprises a plurality of scan flip-flops connected in a chain to provide test access to the one or more logic elements.

20. The fully digital test control access system of claim 17, where the digital non-resettable state retention storage circuit comprises a plurality of non-resettable storage flip-flop devices connected to load the authentication control pattern in response to successful authentication by authentical logic.

21. The fully digital test control access system of claim 17, further comprising a digital safety interlock gate circuit connected to store a safety interlock gate setting that may be accessed independently from the test mode enable signal.

* * * * *